United States Patent [19]

Ameur

[11] Patent Number: 4,678,134
[45] Date of Patent: Jul. 7, 1987

[54] ARRANGEMENT FOR SAFETY BELT

[76] Inventor: Hanafi Ameur, Studenstaden 4, S-75233 Uppsala, Sweden

[21] Appl. No.: 734,269
[22] PCT Filed: Sep. 5, 1984
[86] PCT No.: PCT/SE84/00289
 § 371 Date: May 13, 1985
 § 102(e) Date: May 13, 1985
[87] PCT Pub. No.: WO85/01217
 PCT Pub. Date: Mar. 28, 1985

[30] Foreign Application Priority Data
 Sep. 12, 1983 [SE] Sweden ............................... 8304319

[51] Int. Cl.⁴ ..................... B60R 22/38; B60R 22/40
[52] U.S. Cl. ..................... 242/107.4 A; 242/107.4 B; 280/806
[58] Field of Search .................. 242/107.4 R–107.4 E, 242/107, 107.6, 107.7; 280/806; 297/478, 480, 477, 479

[56] References Cited
U.S. PATENT DOCUMENTS

| 3,781,490 | 12/1973 | Phillips | 242/75.51 X |
| 3,866,854 | 2/1975 | Wehner | 242/107.4 R |
| 3,905,440 | 9/1975 | Ikada et al. | 280/806 |
| 3,915,405 | 10/1975 | Weman | 242/107.4 A |
| 4,103,754 | 8/1978 | Ashworth et al. | 242/107.4 R X |
| 4,103,842 | 8/1978 | Martin et al. | 242/107.4 A |
| 4,338,645 | 7/1982 | Mohri et al. | 242/75.52 X |
| 4,346,778 | 8/1982 | Bluggel et al. | 242/107.4 R X |
| 4,519,652 | 5/1985 | Kamijo | 242/107.4 R X |
| 4,534,441 | 8/1985 | Kamijo et al. | 242/107.7 X |

FOREIGN PATENT DOCUMENTS

| 1430422 | 11/1968 | Fed. Rep. of Germany . |
| 2809395 | 9/1979 | Fed. Rep. of Germany ... 242/107.4 A |
| 2821152 | 11/1979 | Fed. Rep. of Germany . |
| 0200605 | 5/1983 | German Democratic Rep. ............................ 242/107.4 A |
| 53-1527 | 1/1978 | Japan . |
| 211626 | 3/1967 | Sweden . |
| 334552 | 4/1971 | Sweden . |

Primary Examiner—John M. Jillions
Attorney, Agent, or Firm—Bacon & Thomas

[57] ABSTRACT

A safety belt arrangement for protecting passengers in motor driven vehicles comprises a strap roller having a spindle mounted for rotation in a housing, a belt strap wound on the spindle, biasing means for urging the belt strap to wind on the spindle, a locking mechanism to lock the spindle against unwinding rotation, a detector for sensing a reference surface or surfaces on the spindle or on the belt strap and a memory device to register the time interval between signals received from the detector to determine the unwinding velocity of the belt strap and to activate the locking mechanism when a preselected value of the unwinding velocity of the belt strap is exceeded.

10 Claims, 13 Drawing Figures

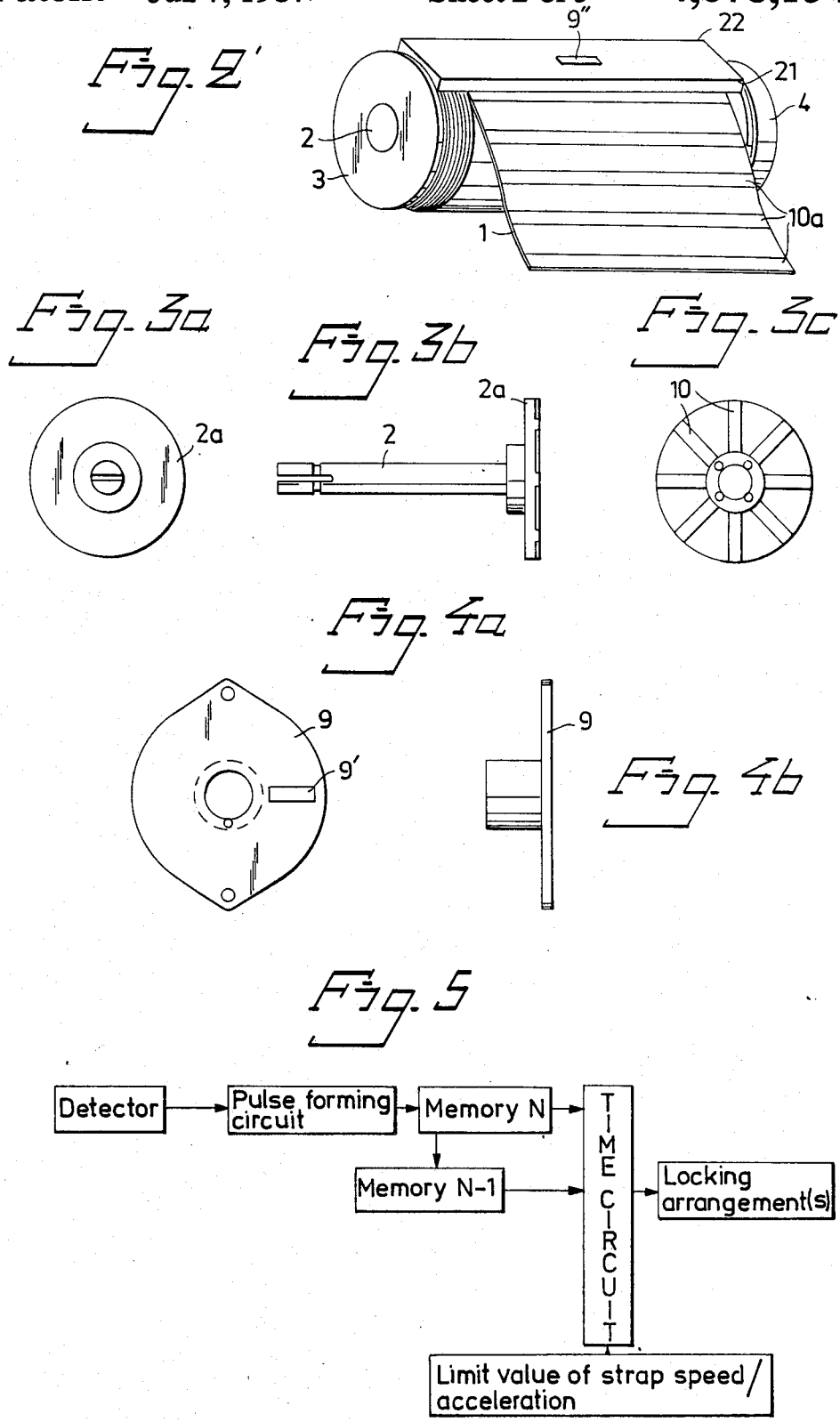

ARRANGEMENT FOR SAFETY BELT

The present invention relates to safety belts for passengers in vehicles such as motor cars, aeroplanes and other wheeled vehicles etc. More closely defined, the invention relates to such safety belts as comprise at least one strap roller for winding on and off at least one belt strap as well as at least one locking arrangement which locks the belt strap and prevents further unwinding from the strap roller once a limit value has been exceeded as regards the belt strap speed/acceleration and the acceleration/deceleration/inclination of the vehicle, aeroplane etc. or as regards any other condition such as speed/height etc. at which the belt strap must be locked.

All previously known designs have the disadvantage that they are not equipped quickly and accurately to sense and prevent unwinding from the strap roller once a limit value in respect of a certain condition has been exceeded or reached.

The present invention aims at overcoming the above and other disadvantages of known safety belt systems. This was achieved as soon as the arrangement for a safety belt herewith described and explained below, from which it follows that one main feature of the invention consists in that the belt strap is locked against unwinding with the aid of at least one locking arrangement which is activated when a preselected limit value has been reached or exceeded as regards the speed/acceleration of the belt strap or the acceleration/deceleration/inclination of the vehicle etc.

The invention is described in detail below with reference to the attached drawings and diagrammatic presentations in which FIG. 1 is a diagrammatic view showing an embodiment of a safety belt arrangement in which a reference surface/surfaces arranged on a strap spindle in accordance with the invention is/are sensed.

FIG. 2 is a diagrammatic view showing an embodiment of a safety belt arrangement in which a reference surface/surfaces arranged on the belt strap in accordance with the invention is/are sensed.

FIG. 2' is a perspective view of the safety belt shown in FIG. 2.

FIG. 3a is an end view of the strap spindle in accordance with the invention.

FIG. 3b is a side view of the strap spindle shown in FIG. 3a.

FIG. 3c is a view showing the opposite end of the strap spindle of FIG. 3a.

FIG. 4a is an end view of the lock casing in accordance with the invention.

FIG. 4b is a side view of the lock casing shown in FIG. 4a.

FIG. 5 is a block diagram illustrating in general terms a strap speed detector in accordance with the invention.

Figure 1:
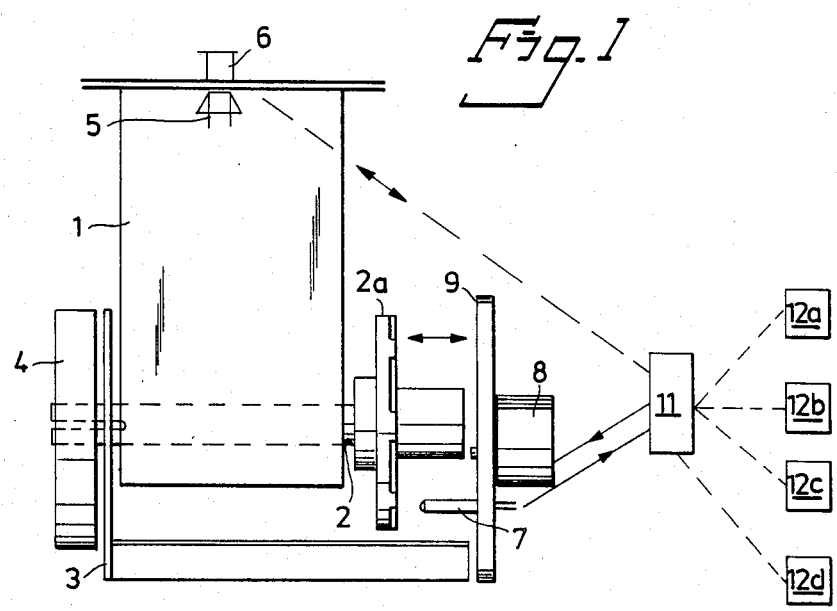

FIG. 1 shows a safety belt system comprising (at least) one belt strap (1) which can be wound on to/unwound from a spindle (2) mounted within an appropriately formed frame housing (3), which is secured at the required point in the vehicle. A winding device (4), e.g. a helical spring, is linked with the shaft (2) and arranged to maintain the belt strap (1) wound on to the spindle (2). The free end of the strap is provided with some suitable locking mechanism, e.g. a diagrammatically illustrated male part (5) which can be locked by insertion into a corresponding female part (6), also shown in diagrammatic form and located at a required suitable point in the vehicle. The above parts may be of as such well known design. Strap spindle (2) is provided with at least one reference surface (10), as shown in FIG. 3, which is sensed by a detector (7) arranged in a casing (9) stationary relative to the strap roller.

The reference surface/surfaces (10) can be conductive, surrounded by non-conductive layers and sensed by an appropriate detector such as pickup brushes. The reference surface/surfaces can be reflective, surrounded by non-reflective layers and sensed by an optical detector, or magnetic, surrounded by non-magnetic layers and sensed by an appropriate detector (inductive sensing). These are only examples of a reference surface/surfaces with an appropriately adapted sensing detector.

Figure 2:
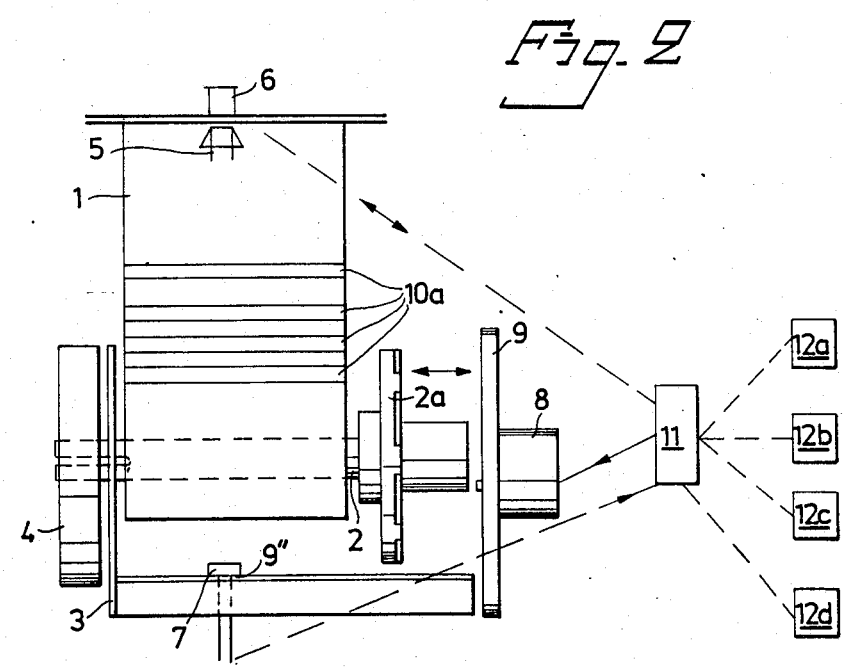

FIGS. 2 and 2' differ from FIG. 1 to the extent that the reference surface/surfaces (10) is/are arranged on belt strap (1) and the detector (7) is arranged within a casing (22) stationary relative to the strap roller and situated within the sensor casing (9"). As for the reference surface/surfaces, this is/these are reflective, magnetic or of similar type with an appropriate sensing detector. Some examples are described above in connection with FIG. 1.

FIG. 3 shows an embodiment of the strap spindle (2) with sensing surfaces (10) arranged on its side (2a).

FIG. 4 shows an embodiment of a lock casing (9) arranged for receiving a sensing detector within a corresponding casing (9').

FIG. 5 shows in general terms how the reference surface/surfaces is/are sensed by a detector. Pulses from the sensing detector (7) are transmitted via a pulse forming circuit to the strap speed detector unit. Two consecutive pulses are fed into two memory circuits "N" and "N−1" whereby a time circuit measures the interval between the pulses. The time circuit has a constant (but variable number) corresponding to the limit value for the strap speed/acceleration. If this value is exceeded the time circuit passes a signal to a locking arrangement (8) whereby the belt strap is prevented from unwinding. The locking arrangement can be an electric magnet, a motor or a similar device.

Figure 6:
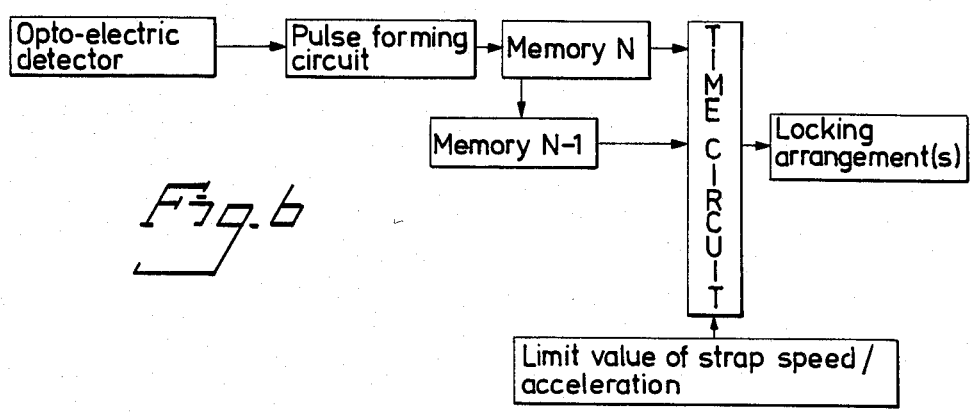
FIG. 6 is a block diagram illustrating a strap speed detector with optical sensing in accordance with the invention.

FIG. 6 shows an embodiment with a reference surface/surfaces suitable for optical sensing. In all other respects it is identical with FIG. 3.

Figure 7:
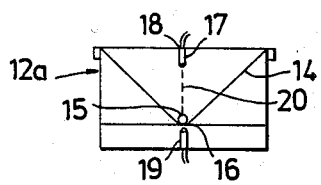
FIG. 7 is a diagrammatic view of an acceleration/deceleration/inclination detector for vehicles, aeroplanes etc. in accordance with the invention.

FIG. 7 shows the other detector, i.e. the acceleration/deceleration/inclination detector (12a). The latter consists of a substantially cup-shaped and conical support (14) and comprises a sphere (15) displaceable in every radial direction from a position of rest at the lowest point (16). With the detector (7) a light emitter (17) is preferably located in the opening (18) of the cover of the cup, which coincides with a light receiver (19), in this case on the underside of the cup. The cup consists of transparent material such as glass, transparent plastic or a similar substance. The light receiver (19)

is connected to a pulse-forming circuit and when the sphere moves from the centre as a result of acceleration/deceleration/inclination a signal is given, whenever the light (20) from the light emitter (17) is sensed by the light receiver (19).

Figure 8:
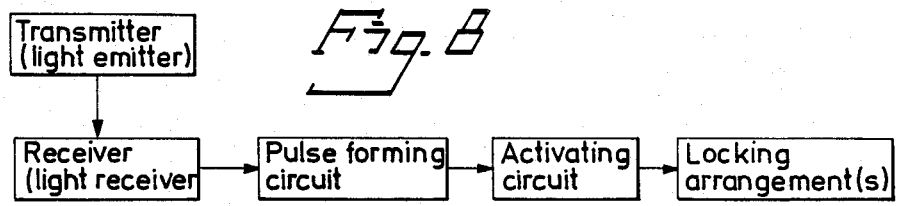
FIG. 8 is a block diagram of an acceleration/deceleration/inclination detector in accordance with the invention.

FIG. 8 shows a block diagram relating to the acceleration/deceleration/inclination detector. Further to the description of the above detector (12a) (FIG. 7) it operates in that the light receiver's signal (which occurs when the sphere moves from the centre and passes through light (20) from the light emitter) is pulsed so as to activate via an activating circuit at least one locking arrangement (8) through control unit (11). The inclination value depends on the angle of conicity ($\beta$) of the cup. The light emitter may be an infra-red light emitter with a corresponding suitable light receiver. Furthermore, the cup-shaped conical support (14) may be filled with liquid in order to achieve a required degree of inertia (so that the sphere will not move at relatively low acceleration/deceleration values). Since the sphere moves in every radial direction acceleration/deceleration/inclination can be sensed irrespective of the direction throughout 360°.

The electronic/electrical control/regulating unit and the arrangement shown in the drawings operate as follows: The control/regulating unit (11) is connected to a suitable current source such as a car battery, advantageously via a fuse and an accumulator with adequate capacity to enable at least one belt locking operation after possible failure or short-circuiting of the current source.

If the control unit (11) also comprises a belt take-up control system, the actual number of passengers is set at the control unit (11). The passengers put on the belts. If the arrangement is used in conjunction with arrangements for controlling belt fastening at the lock the control unit (11) can be so designed that locking of the strap winding mechanism is only possible if the lock components are correctly inserted in one another (see FIG. 9).

FIG. 1 shows a strap speed/acceleration detector (7) which transmits a signal to a locking arrangement (8) when the said preselected value is exceeded. The detector (7) may be designed in various ways and may, for example, be a transducer rotating together with strap spindle (2). With this embodiment (FIG. 6) the detector (7) is an opto-electric detector located on the sensor casing (9') outside the rotary spindle (2). The detector cooperates with one or several reflective surfaces (10) located centrally opposite the detector (7) rotating jointly with the strap spindle (2).

Since the reference surface/surfaces (10) is/are fixed the time interval between the detection of two consecutive reference surfaces constitutes a measure for the strap unwinding speed/acceleration. By comparison with an appropriate time circuit (described below) the unwinding speed/acceleration can be simply read and when it exceeds the preselected limit value a locking arrangement (8) is activated, which locks the strap spindle (2) in relation to the frame. The detector (7) may also be designed in other ways (FIG. 5) (see description in respect of FIG. 1).

FIGS. 2 and 2' differ from FIG. 1 inasmuch as the reference surfaces are arranged on the belt strap. The belt strap passes through an opening (21) centrally opposite one side of which (22) there is a sensor casing (9") which houses a detector (7). The belt strap must be provided with several reference surfaces separated to a certain extent on that part of the strap which is wound on to or unwound from the strap roller. Since the reference surfaces are fixed the time interval between the detection of two consecutive reference surfaces is a measure of the strap unwinding speed/acceleration. By comparison with a suitable time circuit (described below) the strap unwinding speed/acceleration can be simply read and when it exceeds or reaches the preselected limit value at least one locking arrangement (8) is activated, which locks the belt strap thus preventing it from unwinding.

In e.g. a car it is sufficient to install a sensing detector in the driver's strap roller whereby, once the preselected value of strap speed/acceleration has been reached, all locking arrangements in the remaining strap rollers not provided with sensing detectors are activated. Similarly it is the case that not more than one acceleration/deceleration/inclination detector is required in a car.

Triggering of at least one locking arrangement (8) by the detector (7) is preferably effected by means of an electrical/electronic control unit (11) described in detail below. The strap locking mechanism differs from the existing types in that locking of the belt strap so as to prevent unwinding is brought about with the aid of at least one electrical/electronic arrangement which passes a pulse to at least one locking arrangement (8) as soon as a preselected strap speed/acceleration value has been reached or exceeded. With this design an accurate and speedy reading of the strap speed/acceleration is achieved, a signal being transmitted to a locking arrangement (8), which locks the belt strap quickly and reliably so as to prevent unwinding. With the aid of the strap speed/acceleration detector a change in state as regards the speed/acceleration of the strap is measured whereby at least one locking arrangement is activated so as to lock the belt strap and prevent it from unwinding once the preselected belt speed/acceleration limit value has been measured.

Similarly the control unit (11) may register when the preselected acceleration/deceleration/inclination occurs. In this case the control unit (11) is connected with the strap speed/acceleration detector (7), the acceleration/deceleration/inclination detector (12a) and a belt take-up detector (12b) and may possibly be connected with a speed/altitude detector (12c) and also a stillstand detector (12d).

All detectors connected with the control unit (11) have this in common that they coordinate and activate at least one locking arrangement (8) when a certain limit value for a detector has been reached or exceeded whereby at least one belt strap is locked so as to prevent it from unwinding. Going beyond the above examples the control unit (11) may e.g. be connected to the strap lock in a simple manner. For instance a suitably located contact or microswitch may indicate when the locking element is in the locking position whereby a corresponding signal is passed to the control unit (11). The system can be supplemented and refined by providing a speed/height detector (12c) in vehicles, aeroplanes etc. so that when a certain speed/height is measured in respect of them a signal is passed to the control unit (11) and to a stillstand detector (12d) which senses when the vehicle is stationary.

Figure 9:
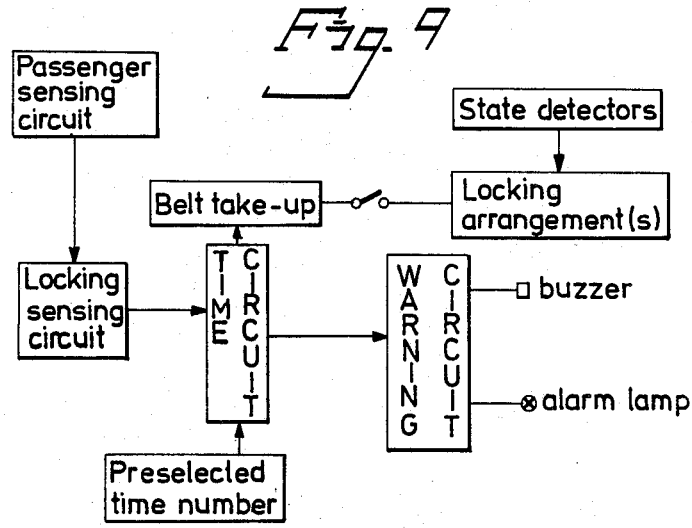
FIG. 9 is a block diagram of a belt take-up detector in accordance with the invention.

The electrical/electronic control unit (11) may e.g. comprise even more state detectors. The most essential are the strap speed/acceleration detector and the acceleration/deceleration/inclination detector as well as (12b) and possibly (12c). The electrical/electronic control unit may also comprise a belt take-up detector (FIG. 9). The belt take-up detector makes it possible to ensure correct insertion of the male locking component into the female locking component. When the belt locking components are inserted a signal is passed from every such lock to the control unit (11), whereby locking arrangements are operated as soon as the limit values of various detectors have been reached or exceeded. With incorrect locking of the belt locking components or if the belt is not put on a warning signal is given until the belt has been put on. With such a belt take-up detector the locking arrangement/s can be operated only after the passenger/s have put on the belt so that the male locking component is correctly inserted in the female locking component.

In block diagram (FIG. 9) a passenger sensing circuit senses when the passenger sits down on his seat. A signal is passed to the control unit as a result of which the belt components are locked provided that the locking arrangement/s is/are released within a preselected time, e.g. 30 seconds. This enables the passenger to put on the belt without repeated locking of the strap roller. Once the preselected time has elapsed a warning signal is given through an output unit such as a buzzer, an alarm light or a similar device until the belt has been put on. If the belt has been put on the contact for the locking arrangement/s closes. Closing of the contact causes these locking arrangements to operate and to be activated whenever the state detectors sense that a limit value has been reached or exceeded.

With reference to FIG. 9, the belt take-up detector differs from existing types in that it is equipped with a time circuit with a preselected (but variable) number so that when the number is exceeded an alarm signal is released through an output unit of a warning circuit. In addition, the said belt take-up detector makes it possible to increase the passengers' comfort by not producing a warning signal as soon as a passenger has sat down on his seat but also inasmuch as the locking arrangement/s can be activated only if the belt has been put on correctly and not while one is putting on the belt strap in order to lock it.

The invention is of course not limited to the above embodiments specially shown in the drawings, many modifications and variations being possible within the framework of the following patent claims.

I claim:

1. A safety belt arrangement for protecting passengers in motor driven vehicles, comprising:
    at least one strap roller having a spindle mounted for rotation in a housing attached to the vehicle body;
    at least one belt strap, one free end of which is attached to said spindle and which can be wound onto and unwound from said spindle;
    biasing means urging said spindle to rotate so as to keep said belt strap wound onto said spindle;
    locking means actuable for locking said spindle so as to prevent further unwinding of said belt strap;
    at least one reference surface provided on said rotating spindle;
    a detector which on unwinding of said belt strap senses said at least one reference surface at least once per revolution of said spindle and passes a signal to a memory means each time a reference surface is detected; and,
    memory means arranged to register the time interval between the signals received from the detector and to determine the unwinding velocity of said belt strap, said memory means activating said locking means when a preselected value of the unwinding velocity is exceeded, thereby preventing further unwinding of said belt strap from said spindle.

2. The arrangement according to claim 1, wherein said detector comprises an opto-electrical detector, and wherein said at least one reference surface is light reflective and surrounded by surfaces contrasting therewith.

3. The arrangement according to claim 2, wherein said reference surfaces are provided on a substantially circular disc, which is concentric with said spindle and co-rotates with the same, said reference surfaces comprising a plurality of regularly spaced lines extending substantially radially on said disc.

4. The arrangement according to claim 1, wherein said reference surfaces are provided on a substantially circular disc, which is concentric with said spindle and co-rotates with the same, said reference surfaces comprising a plurality of regularly spaced lines extending substantially radially on said disc.

5. The arrangement of claim 1 further comprising a second detector for sensing the acceleration/deceleration/inclination of said vehicle, said second detector comprising:
    a sphere; a substantially cup-shaped support containing the sphere such that it is freely movable in every radial direction from a positive of rest at a lowest part of the cup; a transmitter for generating signals and a receiver, one of which is arranged centrally above said lowest part of said cup, and the other of which is arranged centrally below said lowest part, such that said receiver senses the signals from said transmitter when said sphere leaves said position of rest, and transmits said signals via a pulse forming circuit to an activating circuit, which activates said locking means so as to prevent unwinding of said belt strap.

6. A safety belt arrangement for protecting passengers in motor driven vehicles, comprising:
    at least one strap roller having a spindle mounted for rotation in a housing attached to the vehicle body;
    at least one belt strap, one free end of which is attached to said spindle and which can be wound onto and unwound from said spindle;
    biasing means urging said spindle to rotate so as to keep said belt strap wound onto said spindle;
    locking means actuable for locking said spindle so as to prevent further unwinding of said belt strap;
    a plurality of spaced apart reference surfaces provided on said belt strap;
    a detector which on unwinding of said belt strap senses said reference surfaces and passes a signal to a memory means each time a reference surface is detected; and,
    memory means arranged to register the time interval between the signals received from the detector and to determine the unwinding velocity of said belt strap, said memory means activating said locking means when a preselected value of the unwinding velocity is exceeded, thereby preventing further unwinding of said belt strap from said spindle.

7. The arrangement according to claim 6, wherein said detector comprises an optoelectrical detector, and wherein at least one reference surface is light reflective and surrounded by surfaces contrasting therewith.

8. The arrangement according to claim 7, wherein said reference surfaces comprise regularly spaced lines extending in the cross-direction of said belt strap.

9. The arrangement according to claim 6, wherein said reference surfaces comprise regularly spaced lines extending in the cross-direction of said belt strap.

10. The arrangement of claim 6 further comprising a second detector for sensing the acceleration/deceleration/inclination of said vehicle, said second detector comprising:

a sphere; a substantially cup-shaped support containing the sphere such that it is freely movable in every radial direction from a position of rest at a lowest part of the cup; a transmitter for generating signals and a receiver, one of which is arranged centrally above said lowest part of said cup, and the other of which is arranged centrally below said lowest part, such that said receiver senses the signals from said transmitter when said sphere leaves said position of rest, and transmits said signals via a pulse forming circuit to an activating circuit, which activates said locking means so as to prevent unwinding of said belt strap.

* * * * *